Dec. 8, 1959      F. J. BORON      2,915,909

CHAINS

Filed March 22, 1956

INVENTOR

FRANK J. BORON

BY Wallace and Cannon

ATTORNEYS

United States Patent Office 2,915,909
Patented Dec. 8, 1959

2,915,909

CHAINS

Frank J. Boron, Elyria, Ohio, assignor to American Brake Shoe Company, New York, N.Y., a corporation of Delaware Application March 22, 1956, Serial No. 573,261

4 Claims. (Cl. 74—245)

This invention pertains to chains of the kind that are driven by or used to drive a sprocket. The invention pertains also to related kinds of chains or conveyors.

Chains or like endless, flexible members as heretofore constructed have generally included separable pintles connecting one link to another, and there are many instances where a separable pintle introduces complications and difficulties in assemblage and disassemblage, and also in operation of the chain, particularly in chains or conveyor flights of heavy duty construction.

There have been proposals in the prior art of casting links of a chain or the like with integral trunnions serving as pintles, and plates are used to interconnect the trunnions of one such link to the trunnions of an adjacent link. What has been particularly troublesome in this regard has been the way in which the connecting plates joining the trunnions of adjacent links are to be held in place, and the primary object of the present invention is to enable this to be accomplished in a facile and inexpensive manner.

Specifically, the object of the present invention is to afford a chain or the like comprising center links having heads at either end and integral trunnions projecting laterally from opposite sides of each head. Side plates having apertures at opposite ends thereof are mounted on the trunnions corresponding to the trailing end of a leading center link and on the trunnions corresponding to the leading head of the next following adjacent center link. The ends of the trunnions outwardly of the side plates are adapted to receive washers, and these washers are welded or otherwise secured to the exposed ends of the trunnions so as to afford a quick way of assembling the chain, and this constitutes a further specific object of the present invention. In the event that the chain needs to be repaired or have parts thereof replaced, the weld between the washers and the trunnions may be melted through preliminary to disassembling the chain, and this constitutes another object of the present invention.

Other and further objects of the present invention will be apparent from the following description and claims and are illustrated in the accompanying drawing which, by way of illustration, shows a preferred embodiment of the present invention and the principles thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claims.

Figure 1:
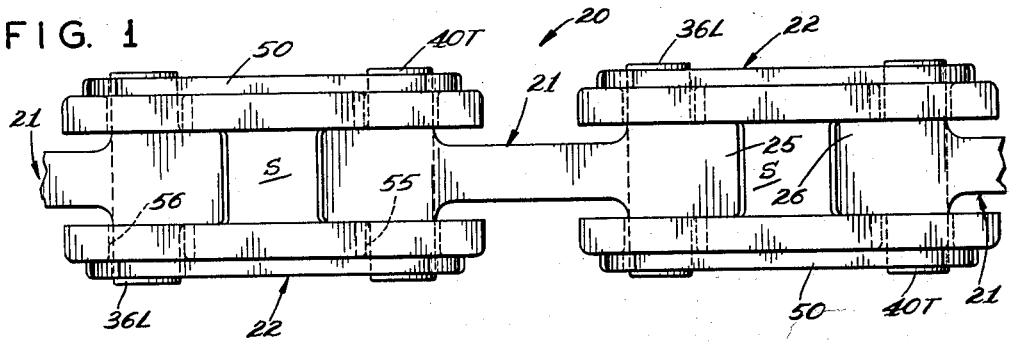
Fig. 1 is a top plan view of a section of a chain constructed in accordance with the present invention.

The present invention is illustrated in Fig. 1 as embodied in a chain 20 including cast center links 21 and cast side plates 22, there being a pair of side plates used to connect opposite ends of a pair of center links. The chain 20 in this instance is adapted to be played about a pair of sprockets, but obviously the invention may be manifested in other but related arrangements.

Figure 2:
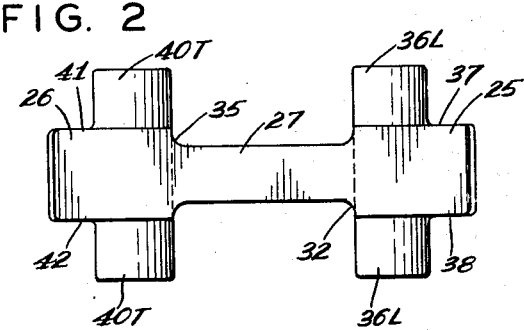
Fig. 2 is a top plan view of a center link.
Figure 3:
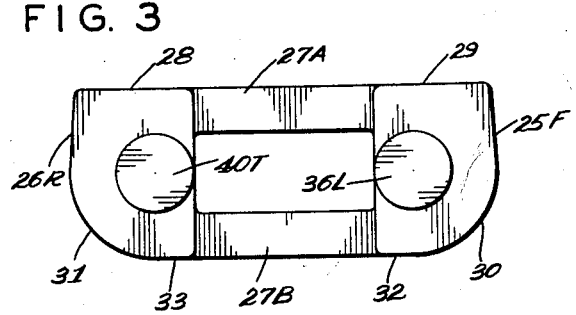
Fig. 3 is a side elevation of the center link.

As shown in Figs. 2 and 3, the center links 21 include heads 25 and 26, and for purposes of description herein the head 25 will be assumed to be the head at the leading end of the center link and the head 26 the head at the trailing end of the center link. Connecting the heads 25 and 26 is a web or body portion 27, and referring to Fig. 3 it will be noted that the body portion 27 includes spaced upper and lower web members 27A and 27B imparting increased strength to the center link and serving to reduce the weight thereof.

The front face 25F of the head 25 and the rear face 26R of the head 26 are flat and tapered outwardly slightly from top to bottom as will be observed in Fig. 3, and upper edges of these faces terminate at flat upper faces 28 and 29 of the heads which are in the plane of the upper face of the upper strut or web 27A. The lower edges of the faces 25F and 26R are arcuate at 30 and 31 to facilitate association with the sprocket, and the bottom faces 32 and 33 of the heads 25 and 26 are in the plane of the lower face of the lower strut or web 27B. As will be observed in Fig. 2, the heads 25 and 26 are somewhat wider than the body portion 27, and fillet surfaces 35 are afforded where the ends of the body member 27 merge into the heads 25 and 26.

The center links 21 include trunnions, and there are a pair of trunnions 36L at the leading end of the center link projecting outwardly in opposite directions from the opposite side faces 37 and 38 of the head 25. Likewise, a pair of trunnions 40T at the trailing end of the center link 21 project outwardly in opposite directions from the opposed side faces 41 and 42 of the head 26 of the center link. It will be noted that the trunnions 36L and 40T are spaced inwardly of the related leading and trailing ends of the center link.

Figure 6:
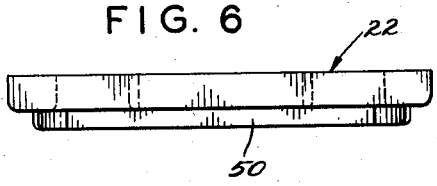
Fig. 6 is a top plan view of a side plate.
Figure 7:
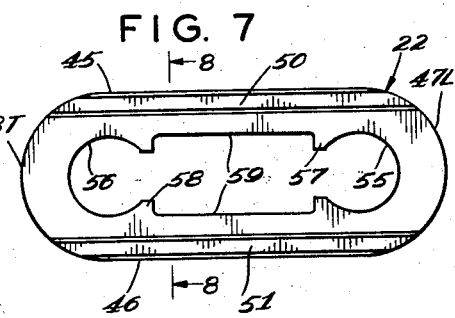
Fig. 7 is a front elevation of the side plate.

In connecting the center links together to afford a chain as 20, resort is had to pairs of side plates 22, Figs. 6 and 7. Each such side plate is relatively narrow, having narrow flat upper and lower faces 45 and 46, and rounded leading and trailing ends 47L and 48T respectively.

Figure 8:
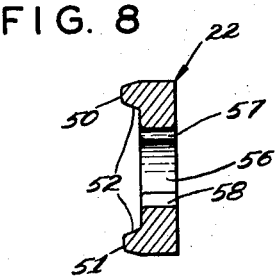
Fig. 8 is a sectional view taken on the line 8—8 of Fig. 7.

Narrow ribs or shoulders 50 and 51 are formed on the outer faces of the side plates 22. These ribs, it will be observed in Figs. 7 and 8, are parallel to one another and parallel to the upper and lower faces 45 and 46 of the related side plate, and the arrangement is such that shoulders 50 and 51 afford recesses 52, Fig. 8, on the outer face of each side plate 22 for a purpose to be mentioned below.

Each side plate 22 includes at the leading end an aperture 55 and a like aperture 56 at the trailing end. The apertures 55 and 56 are cored to afford upper and lower lugs 57 and 58, and the center portion of each side plate intermediate the apertures 55 and 56 is also cored to afford an opening 59, reducing the weight of the side plates 22. As shown in Fig. 1, the apertures 55 and 56 are somewhat larger in diameter than the trunnions 36L and 40T, and this enables the side plates 22 to be assembled on the trunnions of the center links in such a way that the apertures 55 at the leading ends of the side plates receive the trunnions 40T at the trailing end of a center link, while the apertures 56 receive the trunnions 36L at the leading end of the next adjacent trailing center link.

Figure 4:
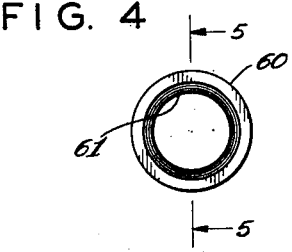
Fig. 4 is an elevation of a washer.
Figure 5:
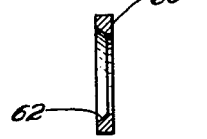
Fig. 5 is a section taken on the line 5—5 of Fig. 4.

To hold the side plates 22 in place, washers 60, Figs. 4 and 5, are used, and the outside diameter of each washer 60 corresponds to the distance separating the ribs 50 and 51. The ends of the trunnions, as shown in Fig. 1, project outwardly of the apertures in the side plates 22, so that the washers 60 may be mounted on exposed ends of the trunnions 36L and 40T in a complemental protected relation within the recesses 52 mentioned above as defined between the ribs 50 and 51. Thus, each washer 60 includes an aperture 61 corresponding to the diameter of the trunnions 36L and 40T, and the apertures 61 are enlarged outwardly at 62 so that when the washers 60 are assembled on the exposed ends of the trunnions within the recesses 52 of the side plates 22 the enlargements 62 about the openings 61 in the washers enable a weld deposit to be afforded between the washers 60 and the exposed ends of the trunnions.

It will be seen from the foregoing that under the present invention a relatively strong chain or the like is afforded wherein the center links are provided with integral trunnions affording means for mounting side plates between adjacent center links to connect the center links. To this end, the side plates are formed with apertures that register with the trunnions of the center links, and the trunnions extend outwardly of the side plates so that retainer washers may be mounted on the exposed ends of the trunnions and secured thereto. It will be appreciated that the spaces S, Fig. 1, between the trailing head 26 of one center link and the leading head 25 of the next center link receive the teeth of the sprocket with which the chain 20 is associated. In other words, in operation the teeth of the sprockets will enter the spaces S to drive or receive motion from the chain 20. The distance between the apertures as 55 and 56 in the side plates 22 determines the width of the spacings S.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A chain or the like of the kind described comprising, center links each having an elongated web member, heads formed integral with each web member at leading and trailing ends thereof, a pair of trunnions integral with each such head and projecting outwardly in opposite directions from the opposite side faces of each such leading and trailing head, side plates on opposite sides of the center links and each having apertures at the leading and trailing ends thereof of larger diameter than said trunnions, the trunnions at the trailing head of one center link being disposed in and projecting outwardly of the apertures at the leading ends of a pair of side plates and the trunnions at the leading head of the next following center link being disposed in and projecting outwardly of the apertures at the trailing end of the same pair of side plates, protective shoulders on the outer faces of the side plates above and below the apertures therein, and separable individual retaining washers welded on the ends of the trunnions that are disposed outwardly of the side plates, said retaining washers being confined in protected relation between said shoulders of the side plates.

2. A chain or the like of the kind described comprising, cast one-piece center links each having an elongated web member, heads cast integral with each web member at leading and trailing ends thereof, a pair of trunnions cast integral with each such head and projecting outwardly in opposite directions from the opposite side faces of each such leading and trailing head, cast one-piece side plates on opposite sides of the center links and each having apertures at the leading and trailing ends thereof of larger diameter than said trunnions, the trunnions at the trailing head of one center link being disposed in the apertures at the leading ends of a pair of side plates and the trunnions at the leading head of the next following center link being disposed in the apertures at the trailing end of the same pair of side plates, and separable individual retaining washers mounted on and welded to the outer free ends of the trunnions.

3. A chain or the like of the kind described comprising, center links each having an elongated web member, heads formed integral with each web member at leading and trailing ends thereof, a pair of trunnions integral with each such head and projecting outwardly in opposite directions from the opposite side faces of each such leading and trailing head, side plates on opposite sides of the center links and each having apertures at the leading and trailing ends thereof, the trunnions at the trailing head of one center link being disposed in and projecting outwardly of the apertures at the leading ends of a pair of side plates and the trunnions at the leading head of the next following center link being disposed in and projecting outwardly of the apertures at the trailing end of the same pair of side plates, retaining washers mounted on the ends of the trunnions that are disposed outwardly of said side plates, the opening in the washers being enlarged at least in part, and weld deposits in the enlarged portions of the openings in the washers uniting the washers to the trunnions.

4. A chain or the like of the kind described comprising, center links each having a narrow elongated web member, heads of greater width than the web member and formed integral with each web member at the leading and trailing ends thereof to project outwardly equal distances from the opposite sides of the web member, a pair of trunnions integral with each such head and projecting outwardly in opposite directions from the opposite side faces of each such leading and trailing head, one-piece side plates on opposite sides of the center links and each having apertures at the leading and trailing ends thereof, said side plates each having a large opening in the center thereof and said apertures being cored to communicate with said opening, the trunnions at the trailing head of one center link being disposed in and projecting outwardly of the apertures at the leading ends of a pair of side plates and the trunnions at the leading head of the next following center link being disposed in and projecting outwardly of the apertures at the trailing end of the same pair of side plates, retaining washers mounted on the ends of the trunnions that are disposed outwardly of said side plates, said side plates each having narrow outwardly projecting upper and lower shoulders on the outer sides thereof which protectively overhang said washers, said shoulders being spaced by substantially the diameter of the related washer to enable that washer to fit neatly between the shoulders, the outer periphery of the openings in the washers being enlarged at least in part, and weld deposits in the enlarged portions of the openings in the washers uniting the washers to the trunnions.

References Cited in the file of this patent

UNITED STATES PATENTS

| 240,819 | Ewart | May 3, 1881 |
| 690,317 | Renold | Dec. 31, 1901 |
| 1,453,088 | Bachman et al. | Apr. 24, 1923 |
| 2,141,771 | Sparling | Dec. 27, 1938 |

FOREIGN PATENTS

| 563,201 | Great Britain | Aug. 2, 1944 |